United States Patent [19]

Owa et al.

[11] Patent Number: 4,637,759

[45] Date of Patent: Jan. 20, 1987

[54] METHOD FOR FORMING A MOISTURE BARRIER IN A SOIL CONTAINING SOLUBLE SALTS

[75] Inventors: Yutaka Owa, Chiba; Yoshiro Tanaka, Ichikawa; Takeshi Saito; Yoshiro Takeda, both of Chiba, all of Japan

[73] Assignee: Lion Corporation, Tokyo, Japan

[21] Appl. No.: 603,367

[22] Filed: Apr. 24, 1984

[30] Foreign Application Priority Data

Apr. 30, 1983 [JP] Japan ................................. 58-77267

[51] Int. Cl.$^4$ ........................................... E02D 3/12
[52] U.S. Cl. ..................................... 405/270; 405/263; 106/900
[58] Field of Search ..................... 405/263, 264, 270; 166/295; 106/74, 84, 900

[56] References Cited

U.S. PATENT DOCUMENTS

| | | | |
|---|---|---|---|
| 3,959,975 | 6/1976 | Graf | 405/263 |
| 3,986,365 | 10/1976 | Hughes | 405/264 |
| 4,064,940 | 12/1977 | Sparlin | 405/263 X |
| 4,168,593 | 9/1979 | Jankowiak | 405/264 X |

*Primary Examiner*—Dennis L. Taylor
*Attorney, Agent, or Firm*—Brisebois & Kruger

[57] ABSTRACT

The invention provides a method for improving the nature of soil in a salty land not suitable for agriculture by forming a moisture barrier in the soil with formation of a water-impermeable layer of soil underground. The method comprises sprinkling a water-soluble polymer, e.g. a copolymer of acrylic acid, or polymer blend including, for example, polyacrylic acid, capable of being insolubilized by interacting with the salt, preferably, in an aqueous solution over the salty land so that a water-impermeable layer underground is formed by the insolubilized polymer together with the soil particles.

5 Claims, No Drawings

METHOD FOR FORMING A MOISTURE BARRIER IN A SOIL CONTAINING SOLUBLE SALTS

BACKGROUND OF THE INVENTION

The present invention relates to a method for building up a moisture barrier in a soil so as to improve the nature of the soil by preventing the groundwater containing soluble salts from transudation toward the surface layer.

It is not rare that the soils of deserts or filled-in lands in a seacoast district contain a considerably large amount of salts such as sodium chloride detrimental to the growth of plants prohibiting the use of the land for agriculture. These salts are mobile in the soil and, even when the salt content in the portion of the soil at or near the land surface has been completely removed by one or other measures, evaporation of the water from the surface of the land in the daytime causes capillary action of the water in the depth of soil to ascend toward the surface layer bringing the salt as dissolved therein which again descends to the depth of the soil in the night or in a rainy weather to regain the original salty condition of the soil in the surface layer after repetition of the ascending and descending movements of the salt. Therefore, nature of a soil can be permanently improved only by taking a measure to prevent transudation of the salts in the depth of the soil toward the surface layer.

The conventional methods for the prevention of transudation of salts in soil include a method of spreading a plastic sheet in the soil underground, a method of forming a moisture barrier of asphalt underground and a method in which certain soil-solidifying agents, such as a cement milk, water glass, urethane, acrylamide, salts of acrylic acid and the like in the form of an aqueous solution or dispersion, are injected into the soil under pressurization through an injection nozzle inserted into the soil so that the soil is solidified by the interaction with such a soil-solidifying agent to form a water-impermeable layer underground.

These prior art methods are, however, not quite satisfactory from the standpoint of practicability. For example, the methods of spreading a plastic sheet and forming a moisture barrier of underground are time and labor-consuming because a large volume of the soil in the upper layer of the land must be grubbed up followed by returning the grubbed-up soil to the same area of the land so that these methods are practically applicable only to a very limited area of the land. The method of the injection of a soil-solidifying agent such as a cement milk is, on the other hand, also not free from disadvantages and practically not satisfactory because the process of the method is complicated involving the troublesome preparation of the solidifying agent and control of the conditions of injection and, in addition, it is important in this method in order to obtain satisfactory results that the injection must be performed at as many spots as possible all over the area of the land under treatment.

SUMMARY OF THE INVENTION

The object of the present invention is to provide an improved method for building up a moisture barrier in a soil and preventing the groundwater containing soluble salts dissolved therein from transudation toward the surface layer of the soil free from the above described disadvantages and problems in the prior art methods.

The method of the present invention is based on the discovery of the phenomenon that certain water-soluble polymeric substances are insolubilized by the interaction with the salts in a soil and comprises forming a water-impermeable layer or a moisture barrier in a soil containing a soluble salt by sprinkling a water-soluble polymer capable of being insolubilized by the interaction with the salt contained in the soil.

DETAILED DESCRIPTION OF THE PREFERRED EMBODIMENTS

The water-soluble polymers suitable for the inventive method are those insolubilized in an aqueous solution of a salt, such as an alkali metal salt, e.g. sodium chloride, contained in a soil. The polymers should have a characteristic that precipitates are formed of the insolubilized polymer when an aqueous solution of the polymer in a concentration of 5% by weight or, preferably, 3% by weight is admixed with an aqueous solution of sodium chloride in a concentration of 1% by weight. Exemplary of such a water-soluble polymer are a copolymer of (A) acrylic acid and (B) acrylamide and/or N-vinyl-2-pyrrolidone in a copolymerization ratio of 1:100 to 100:1 and a polymer composition of (C) a polyacrylic acid or a sulfated polysaccharide, e.g. sulfated cellulose and carageenan, and (D) a nonionic polymer selected from the group consisting of polyacrylamide, polyvinyl pyrrolidone, polyvinyl alcohol, hydroxyalkyl celluloses, hydroxyalkyl starches and guar gum in a ratio of 1:100 to 100:1 by weight. The water-soluble polymer used in the inventive method is insolubilized more easily when a salt of an alkaline earth metal is present in the soil.

It is hitherto known that polyacrylic acid per se is insolubilized by a salt of an alkaline earth metal but it is a quite novel discovery that even a monovalent metal ions as in an alkali metal salt can readily insolubilize a polyacrylic acid when it is combined with a second polymeric component in the form of either a polymer blend or a copolymer leading to the very wide applicability of the inventive method. In short, the water-soluble polymer used in the inventive method can be any one of those capable of being insolubilized by the soluble salt contained in the soil without particular limitations.

In practicing the method of the present invention, the water-soluble polymer may be sprinkled in a powdery form as such but a preferable way is to sprinkle an aqueous solution of the polymer in a concentration of 0.01 to 30% by weight. When the water-soluble polymer is used in a powdery form, sprinkling or distribution of the powder should be immediately followed by water sprinkling in a volume sufficient to dissolve and dilute the polymer into the above mentioned concentration in order to facilitate penetration of the polymer to reach a suitable depth of the soil.

When a water-soluble polymer of the above specified type or an aqueous solution thereof is sprinkled over the surface of a salt-containing soil according to the inventive method, the polymer infiltrating into the soil is gradually precipitated in an insolubilized form by the interaction with the salt in the ambient soil to form gross coagulations so that the penetration of the polymer through the soil is interrupted at a certain depth in the soil underground forming a water-impermeable layer at the level together with the soil particles.

As is understood from the above description, the advantages of the inventive method are obtained in that the mobility of the salt below the thus formed moisture barrier toward the upper layer of the soil is steeply reduced by the moisture barrier formed at a suitable level by the insolubilized polymer. Thus, the method of the present invention is useful as a method for the restoration of salt-injured lands and prevention of injure from salt in lands for agriculture with further applicability to the works for saving the irrigation volume in farms as well as to the embankment works in dams, banks, canals, reservoirs and the like.

Following are the examples to illustrate the method of the invention in more detail.

EXAMPLE 1

With an object to preliminarily estimate the interaction of various water-soluble polymers with sodium chloride contained in soils, aqueous solutions of sodium chloride in varied concentrations up to saturation were each added to an aqueous solution of one of the polymers indicated in Table 1 below in a concentration of 2% by weight and the behavior thereof was visually examined to give the results shown in the table. The results are given in 4 grades of A, B, C and D according to the following criteria.

A: Precipitates were formed in a large amount.
B: Precipitates were formed.
C: Slight turbidity appeared in the solution.
D: The solution remained clear.

As is understood from the table, each of the composite polymers according to the inventive method interacted with sodium chloride and was insolubilized while no interaction was noted between a single water-soluble polymer and the salt.

TABLE 1

| Water-soluble polymer or polymer blend (blending ratio by weight) | Concentration of aqueous sodium chloride solution, % by weight | | | | |
|---|---|---|---|---|---|
| | 0.1 | 1.0 | 5.0 | 10.0 | Saturation |
| Polyacrylic acid + polyacrylamide (3:1) | C | B | B | A | A |
| Polyacrylic acid + polyacrylamide (5:1) | B | B | A | A | A |
| Polyacrylic acid + polyacrylamide (10:1) | B | A | A | A | A |
| Polyacrylic acid + polyvinyl pyrrolidone (1:1) | B | B | A | A | A |
| Copolymer of acrylic acid and acrylamide | B | B | A | A | A |
| Sodium polyacrylate | D | D | D | D | D |
| Polyacrylic acid | D | D | D | C | D-B |
| Polyacrylamide | D | D | D | D | D |
| Polyvinyl pyrrolidone | D | D | D | D | D |
| Polyvinyl alcohol | D | D | D | D | D-C |

EXAMPLE 2

A polyacrylic acid having an average molecular weight of 110,000 and a polyacrylamide having an average molecular weight of 700,000 were dissolved together in water in a weight ratio of 10:1 to give an overall polymer concentration of 2.0% by weight.

A glass tube of 40 mm inner diameter and 500 mm length held upright and covered at the lower open end with a fine mesh net was filled with sand having a particle size distribution of 0.1 to 1.0 mm and containing 4% by weight of sodium chloride to a height of 450 mm from the lower end. A 100 ml portion of the above prepared aqueous solution of the water-soluble polymers was poured over the sand column in the glass tube to freely flow down through the sand column. After standing for 1 hour, fresh water was added into the glass tube in a 2 cm depth onto the surface of the sand column and this depth was maintained over 1 hour. The water passing through the sand column was received in a cup at the bottom of the glass tube but the total volume of the received water was almost zero.

For comparison, the same test as above was undertaken excepting the omission of the treatment of the sand column with the aqueous polymer solution. In this case, the rate in volume of the water passing through the sand column was constant at about 20 ml/minute.

EXAMPLE 3

The same experimental procedure was repeated as in Example 2 using a copolymer of 10 moles of acrylic acid and 1 mole of acrylamide having an average molecular weight of 250,000 or a 1:1 by weight polymer composition of a polyacrylic acid having an average molecular weight of 110,000 and a polyvinyl pyrrolidone having an average molecular weight of 40,000 in place of the polyacrylic acid and the polyacrylamide in combination. The results were that almost no water leakage through the sand column was noted in each of the cases.

EXAMPLE 4

The same experimental procedure as in Example 2 above was repeated by using an aqueous solution of the polyacrylic acid, the polyacrylamide, each being the same one as used in Example 2, and a polyvinyl alcohol having an average molecular weight of 90,000 in a weight ratio of 10:1:5 to give an overall polymer concentration of 3.0% by weight. The results were that almost no water leakage through the sand column was noted.

EXAMPLE 5

The same experimental procedure as in Example 2 was repeated by using a polyacrylic acid having an average molecular weight of 150,000 and a hydroxyethyl cellulose having an average molecular weight of 170,000 in a weight raito of 3:1. The results were that almost no water leakage was noted through the sand column.

EXAMPLE 6

The same experimental procedure as in Example 2 was repeated by using a polyacrylic acid having an average molecular weight of 150,000 and guar gum having an average molecular weight of 300,000 mixed in a weight ratio of 10:1. The results were that almost no water leakage was noted through the sand column.

EXAMPLE 7

The experimental procedure in Example 2 was repeated under just the same conditions excepting the use of an aqueous solution of a polyacrylic acid having an average molecular weight of 150,000 and a hydroxypropyl starch having an average molecular weight of 10,000 mixed in a weight ratio of 1:1 by weight and dissolved in an overall concentration of 2% by weight. The results were that almost no water leakage was noted through the sand column.

EXAMPLE 8

The experimental procedure in Example 2 was repeated under just the same conditions excepting the use of an aqueous solution of a polyacrylic acid having an average molecular weight of 150,000 and a polyvinyl alcohol having an average molecular weight of 80,000 mixed in a weight ratio of 2:1 and dissolved in an overall concentration of 2% by weight. The results were that almost no water leakage was noted through the sand column.

EXAMPLE 9

The experimental procedure in Example 2 was repeated under just the same conditions excepting the use of an aqueous solution of a sulfated cellulose having an average molecular weight of 200,000 and a hydroxyethyl cellulose having an average molecular weight of 170,000 mixed in a weight ratio of 2:1 and dissolved in an overall concentration of 1% by weight. The results were that almost no water leakage was noted through the sand column.

EXAMPLE 10

The experimental procedure in Example 2 was repeated under just the same conditions excepting the use of an aqueous solution of a sulfated cellulose having an average molecular weight of 200,000 and a hydroxypropyl starch having an average molecular weight of 10,000 mixed in a weight ratio of 1:1 and dissolved in an overall concentration of 2% by weight. The results were that almost no water leakage was noted through the sand column.

EXAMPLE 11

The experimental procedure in Example 2 was repeated under just the same conditions excepting the use of an aqueous solution of a polyacrylic acid having an average molecular weight of 110,000 and a polyacrylamide having an average molecular weight of 500,000 mixed in a weight ratio of 20:1 and dissolved in an overall concentration of 2% by weight. The results were that almost no water leakage was noted through the sand column.

EXAMPLE 12

The experimental procedure in Example 2 was repeated under just the same conditions excepting the use of an aqueous solution of a polyacrylic acid having an average molecular weight of 110,000 and a polyacrylamide having an average molecular weight of 10,000,000 mixed in a weight ratio of 20:1 and dissolved in an overall concentration of 2% by weight. The results were that almost no water leakage was noted through the sand column.

What is claimed is:

1. A method for forming a moisture barrier in a soil containing a soluble salt which comprises sprinkling a water-soluble polymer, or a combination of water-soluble polymers capable of being insolubilized by the interaction with the slat in the soil, over the soil, to form a water-impermeable layer in the soil underground, wherein the water-soluble polymer, or the combination of water-soluble polymers is selected from the group consisting of a copolymer of (A) acrylic acid and (B) acrylamide and/or N-vinyl-2-pyrrolidone, and a polymer composition of (C) polyacrylic acid and/or sulfated polysaccharide, and (D) a nonionic polymer solected from the group consisting of polyacrylamide, polyvinyl pyrrolidone, polyvinyl alcohol, hydroxyalkyl celluloses, hydroxyalkyl starches and guar gum.

2. A method for forming a moisture barrier within and below the surface of a soil containing a soluble salt within the soil and below the surface of the soil, which comprises sprinkling over and onto the surface of the soil, to penetrate into and below the surface of the soil, a water-soluble polymer, or a combination of water-soluble polymers, capable of being insolubilized by the interaction with the salt in the soil, to form a water-impermeable undergound layer in the soil below the surface of the soil to thereby prevent transudation toward the surface of the soil of groundwater containing soluble salts.

3. A method as claimed in claim 2 wherein said step of sprinkling the polymer or polymers on the surface of the soil comprises sprinkling an aqueous solution of the polymer or polymers at a concentration to penetrate in and below the surface of the soil to form said moisture barrier within and below the surface of the soil.

4. The method as claimed in claim 2 wherein the water-soluble polymer or the combination of water-soluble polymers is insolubilized and precipitated when an aqueous solution thereof in a concentration of 5% by weight is admixed with an aqueous solution of sodium chloride in a concentration of 1% by weight.

5. The method as claimed in claim 2 wherein the water-soluble polymer or the combination of water-soluble polymers is sprinkled over the soil in the form of an aqueous solution in a concentration in the range from 0.01 to 30% by weight.

* * * * *